(12) United States Patent
Iqbal et al.

(10) Patent No.: US 6,572,997 B1
(45) Date of Patent: Jun. 3, 2003

(54) NANOCOMPOSITE FOR FUEL CELL BIPOLAR PLATE

(75) Inventors: Zafar Iqbal, Morristown, NJ (US); Jeff Pratt, Budd Lake, NJ (US); Jim Matrunich, Mountainside, NJ (US); James V. Guiheen, Madison, NJ (US); Hongli Dai, Wilmington, DE (US); Tim Rehg, Rancho Palos Verdes, CA (US); Dave Narasinham, Flemington, NJ (US)

(73) Assignee: Hybrid Power Generation Systems LLC, Los Angeles, CA (US)

( * ) Notice: Subject to any disclaimer, the term of this patent is extended or adjusted under 35 U.S.C. 154(b) by 0 days.

(21) Appl. No.: 09/569,897

(22) Filed: May 12, 2000

(51) Int. Cl.[7] ................................................. H01M 8/02
(52) U.S. Cl. .......................... 429/34; 423/414; 252/502
(58) Field of Search ...................... 429/30, 34; 423/414; 252/502

(56) References Cited

U.S. PATENT DOCUMENTS

| | | | |
|---|---|---|---|
| 4,098,967 A | 7/1978 | Biddick et al. | |
| 4,124,747 A | 11/1978 | Murer et al. | |
| 4,339,322 A | * 7/1982 | Balko et al. | 204/255 |
| 4,686,072 A | * 8/1987 | Fukuda et al. | 264/29.5 |
| 4,758,473 A | 7/1988 | Herscovici et al. | |
| 5,141,828 A | 8/1992 | Bennion et al. | |
| 5,173,362 A | 12/1992 | Takkanat et al. | |
| 5,338,320 A | * 8/1994 | Fukuda et al. | 29/623.1 |
| 5,726,105 A | * 3/1998 | Grasso et al. | 442/326 |
| 5,863,671 A | 1/1999 | Spear, Jr. et al. | |
| 5,942,347 A | * 8/1999 | Koncar et al. | 429/30 |
| 6,180,275 B1 | * 1/2001 | Braun et al. | 429/34 |

* cited by examiner

Primary Examiner—Patrick Ryan
Assistant Examiner—M. Wills
(74) Attorney, Agent, or Firm—Sutherland Asbill & Brennan LLP

(57) ABSTRACT

An electrically conductive flow-field plate in a proton exchange membrane fuel cell comprises a composition made of a resin and a plurality of carbon nanotubular fibers having an average diameter is at least about 0.5 nm and up to about 300 nm. The carbon nanotubular fibers are present at not more than about 85 wt. %. The resin can be of a thermoplastic type, a fluorinated type, a thermosetting type and a liquid crystalline type.

17 Claims, 8 Drawing Sheets

NANOCOMPOSITE FOR FUEL CELL BIPOLAR PLATE

BACKGROUND OF THE INVENTION

The present invention generally relates to fuel cells and, more particularly, to an improved bipolar plate and method of making the same that is corrosion resistant, has good electrical conductivity, and is low in manufacturing cost.

A fuel cell is a galvanic conversion device that electrochemically reacts a fuel with an oxidant within catalytic confines to generate a direct current. A fuel cell includes a cathode electrode that defines a passageway for the oxidant and an anode electrode that defines a passageway for the fuel. A solid electrolyte is sandwiched between and separates the cathode from the anode. An individual electrochemical cell usually generates a relatively small voltage. Thus, to achieve higher voltages that are useful, the individual electrochemical cells are connected together in series to form a stack. Electrical connection between cells is achieved by the use of an electrical interconnect between the cathode and anode of adjacent cells. Also typically included in the stack are ducts or manifolding to conduct the fuel and oxidant into and out of the stack.

The fuel and oxidant fluids are usually gases and are continuously passed through separate passageways. Electrochemical conversion occurs at or near the three-phase boundary of the gas, the electrodes (cathode and anode) and electrolyte. The fuel is electrochemically reacted with the oxidant to produce a DC electrical output. The anode or fuel electrode enhances the rate at which electrochemical reactions occur on the fuel side. The cathode or oxidant electrode functions similarly on the oxidant side.

One type of fuel cell is a proton exchange membrane ("PEM") cell. In such a fuel cell, a proton exchange membrane ("PEM") is located between two electrodes (cathode electrode and anode electrode) to form a sandwich-like assembly, which is often referred to as a "membrane-electrode-assembly." The two electrodes are each comprised of a thin sheet of porous material that is permeable to liquid and gas. The two electrodes are situated on either side of a proton exchange membrane such that one surface of each electrode abuts a catalyst layer.

The remaining surface of each electrode respectively abuts a nonporous, gas impermeable, electrically conductive plate. The electrically conductive plate has channels or flow fields for gas flow, and serves as a manifold to distribute fuel gas across the abutting electrode. The two electrically conductive plates are electrically connected together by an external circuit.

Hydrogen fuel gas flows through the grooves in the electrically conductive plate on the anode electrode side, diffuses through the anode electrode, and reacts with the catalyst to produce free electrons and $H^+$ ions. The electrons flow to the cathode electrode by means of the external circuit, and the $H^+$ ions migrate through the PEM to the cathode electrode. Oxygen gas flows through the grooves of the electrically conductive plate on the cathode electrode side and reacts with the $H^+$ ions and free electrons to form liquid water.

In a fuel cell stack, the electrically conductive plates are often referred to as bipolar plates because one face contacts the cathode electrode while the opposite face contacts the anode electrode. Each bipolar plate therefore conducts electrical current from the anode of one cell to the cathode of the adjacent cell in the stack. The electrical current is collected by the two plates at the ends of a stack, known as end plates or current collectors. A stack-design dependent number of thicker plates comprising channels in the plate thickness for a coolant fluid are used to control the temperature of the stack to about 85 C.

However, in the PEM fuel cell environment, the bipolar plates are subject to corrosion due to gases formed by reaction and water. Therefore, in addition to having sufficient electrical conductivity, the bipolar plates have to be corrosion resistant so as to maintain adequate conductivity and maintain dimensional stability over the operational life of the fuel cell.

Graphite bipolar plates have exhibited qualities of sufficient conductivity and corrosion resistance. Yet, graphite plates typically require several manufacturing steps, such as densification with a phenolic resin, followed by high temperature carbonization. Further, graphite bipolar plates, in general, are relatively brittle, particularly when formed as thin sheets in a fuel cell stack, and expensive machining is necessary to form the flow-fields, since near-net shape fabrication of the plates is not possible with graphite.

An example of the use of graphite is shown in U.S. Pat. No. 4,124,747. Therein, it was noted that past compositions of polymeric plastics loaded with conductive solids such as carbon black, graphite, and finely divided metals have shown poor mechanical properties and are porous. In particular, thermoplastic polymers and conductive fillers were not deemed suitable for sophisticated applications such as a fuel cell. Nevertheless, in the invention, a bipolar plate was made from a mixture of crystalline propylene-ethylene thermoplastic copolymer and at least 30 parts by weight of carbon black and/or graphite per 100 parts by weight of copolymer. The mixture was prepared under high shear and at least 100° C. to minimize degradation of the copolymer. The resulting product had a resistivity from about 0.5 to 10 ohms-cm. No fuel cell test data was shown. Resistivity levels shown may be too high for use of the plates in a fuel cell. Higher carbon loadings would therefore be needed, precluding the use of high shear mixing.

Another example of using graphite with a thermoplastic polymer for a bipolar plate is U.S. Pat. No. 4,339,322. The graphite and thermoplastic fluoropolymer were combined in a weight ratio from 2.5:1 to 16:1. Carbon fibers were added for strength and conductivity. The fibers were preferably hammer-milled fibers having an average diameter of 0.05 inches. The resulting bipolar plate was formed by compression molding and had a resistivity down to about $1.9 \times 10^{-3}$ ohms/inch. Although mechanical strength may be improved by this approach, the use of compression molding is likely to leave porosity at the interfaces between the fibers and the polymer matrix.

In U.S. Pat. No. 4,098,967, a bipolar plate for a lead-acid battery was made from a plastic filled with a glassy or vitreous carbon at 40 to 80% carbon by volume. The plastics included thermoplastics and fluorocarbon plastics. However, it was noted that the conductivity of vitreous carbon was substantially less than that of carbon black or graphite and, therefore, heavy loading was required. The resulting product has a specific resistance of about 0.0002 ohm-cm. The use of compression molding and high carbon loadings in this design is likely to provide poor mechanical properties and relatively high porosity.

In the context of another lead-acid battery, U.S. Pat. No. 5,141,828 discloses a mixture of thermoplastic polymer (such as polyethylene) and a uniform dispersion of carbon black for the bipolar plates. The carbon black was present at about 20 to 40% by weight. The polymer and carbon black were mixed in a solvent, the solvent was then evaporated, and the resulting mixture was pulverized to form a powder. The powder was then compression molded into plates. While it was claimed that the plates provided low internal resistance, no quantitative specifics were disclosed. The relatively low carbon content would provide better mechanical properties on compression molding, but the resistivity levels are likely to be too high for fuel cell operation.

A graphite powder bipolar plate for a zinc bromide battery was disclosed in U.S. Pat. No. 4,758,473. Prior vitreous carbon bipolar plates were noted to be brittle, expensive, and chemically unstable. It was further noted that prior bipolar plates made of graphite and thermoplastic fluoropolymers, as well as glassy carbon and plastic, did not provide low cost, durability, and good electrical performance. Thus, in the invention, graphite was heat treated up to about 800° C. The heat-treated graphite was then mixed with a thermoplastic resin in a weight ratio between 1:5 and 1:1. The mixture was then pressure molded at 190° C. No electrical data were provided, and it is unlikely that annealing at 800° C. is high enough to improve the electrical conductivity of the graphite used.

Another zinc bromide battery used carbon black with a polymeric matrix (e.g., a polyproylene copolymer) for its bipolar plates in U.S. Pat. No. 5,173,362. The carbon black was present at about 5 to 40 wt. %. "Long or continuous fibers" (such as glass fiber mat) were also added in the mixture to provide reinforcement. The bipolar plate resistivity appeared to approximate 1.23 ohms/cm, which is likely to be too high for PEM fuel cell operation. Moreover, the process described may be difficult to scale-up.

U.S. Pat. No. 5,863,671 shows a bipolar plate that is constructed by a lamination of a core of non-conductive plastic or ceramic that is sandwiched between conductive platelets of metal or conductive ceramic or conductive plastic. The metal is typically titanium protected by a titanium nitride coating. No specifics of the conductive plastic component were given. The coated titanium used in one version was likely to have issues of corrosion and cost.

A past alternative to the use of graphite and carbon black is noble metals, such as platinum and gold. They have exhibited the needed qualities in bipolar plates. But they are prohibitively expensive to use.

As can be seen, there is a need for an improved electrically conductive plate bipolar plate while maintaining mechanical properties, and method of making the same in thin parts, for a viable PEM fuel cell. A bipolar plate is needed that exhibits adequate conductivity, is corrosion resistant, and is low in manufacturing cost. A bipolar plate is needed that also has good mechanical strength and is impermeable to hydrogen and air in fuel cell operating conditions.

SUMMARY OF THE INVENTION

In one aspect of the present invention, an electrically conductive flow-field plate in a proton exchange membrane fuel cell comprises a composition made of a resin and a plurality of carbon nanotubular fibers having an average diameter that is at least about 1 nm and up to about 300 nm. In another aspect of the present invention, an electrically conductive plate with molded channels for use in a proton exchange membrane fuel cell comprises a composition made of a resin and a plurality of carbon nanotubular fibers present at not more than about 85 wt. %.

In still another aspect of the present invention, a method of making a conductive plate for a proton exchange membrane fuel cell comprises compounding a mixture of carbon nanotubular fibers and a resin, with the carbon fibers being present at about 7 to 85 wt. %; and molding the mixture. Preferably, the carbon fibers are present at about 10 to 50 wt. % and the mixture is injection molded to obtain flow-field bipolar plates in near-net shape.

These and other features, aspects and advantages of the present invention will become better understood with reference to the following drawings, description and claims.

DETAILED DESCRIPTION OF THE INVENTION

While the present invention is described below in the context of a "bipolar plate" for a PEM fuel cell, the present invention is not so limited. Rather, the scope of the present invention generally encompasses an "electrically conductive flow-field plate." In such instance, the plate can be at the end of a fuel cell stack and, thus, not require flow fields on both sides, as in a bipolar plate located within the stack.

Figure 1:
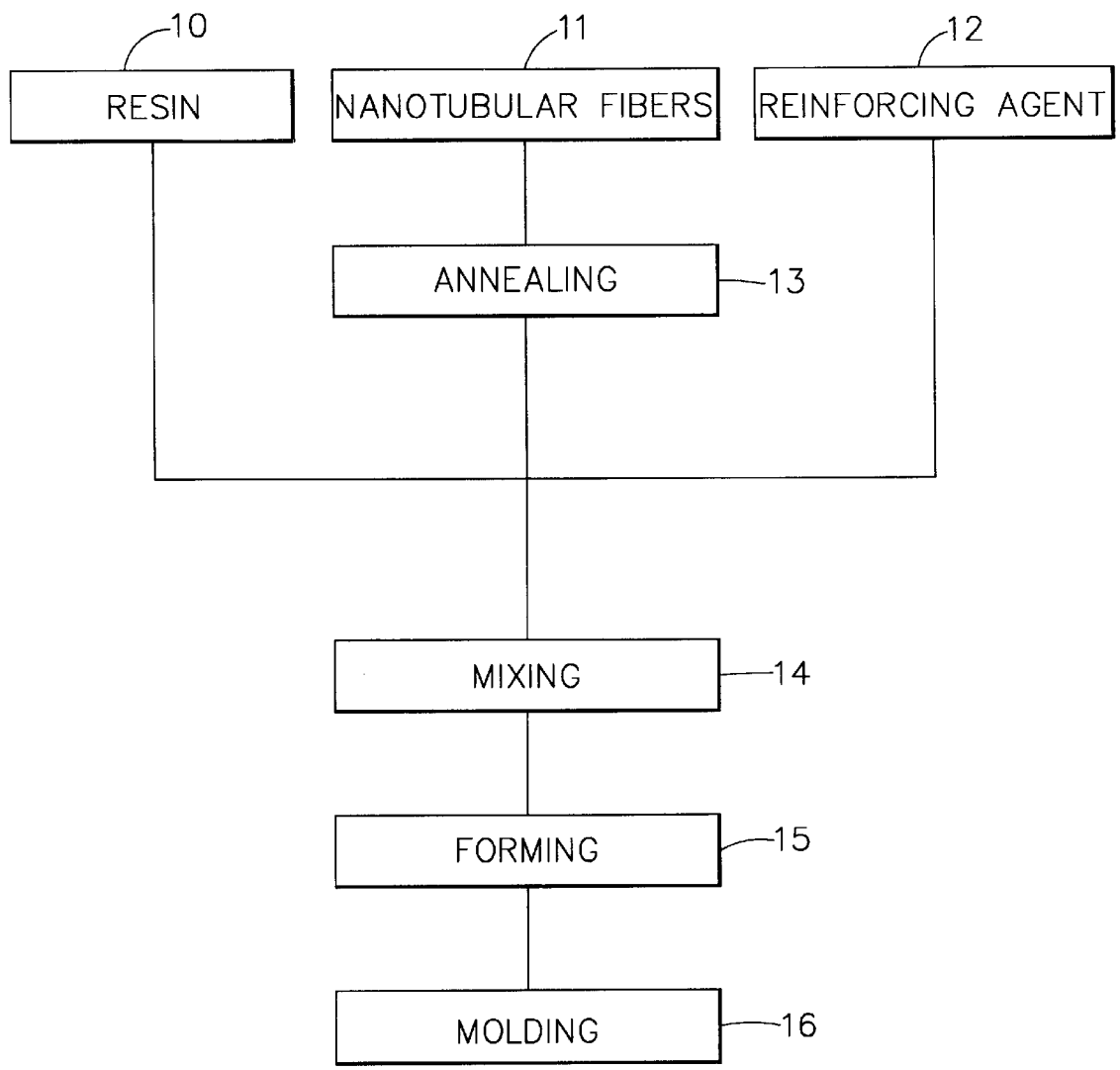
FIG. 1 is a flow chart of the method according to an embodiment of the present invention.

FIG. 1 is a flow chart depicting the various steps or acts according to one embodiment of making the bipolar plate according to the present invention. A source of resin 10 is provided. The resin 10 generally functions to act as a matrix in which the nanotubular fibers are embedded and, therefore, can be of various types. Useful types of resins 10 can include, for example, thermoplastic, fluorinated, thermosetting, and liquid crystalline. Examples of thermoplastic resins 10 include polypropylene copolymers, high-density polyethylene, polyacrylonitrile and silicone elastomers. Examples of fluorinated resins 10 include polyvinylidene fluoride and polychlorotrifluoroethylene (Aclon™ made by Honeywell). Some thermosetting resins 10 include epoxy and polyester amide, while liquid crystalline resins 10 include Vectra™ made by Ticona and pitch.

Irrespective of the particular one used, the resin 10 is preferably in a powder form that is sieved between about a mesh size (U.S. Standard ASTME 11-61) of about 10 to about 100. A preferred mesh size is about 20 so that intimate mixing of the resin 10 with the below-described nanotubular fibers is obtained.

Figure 2A:
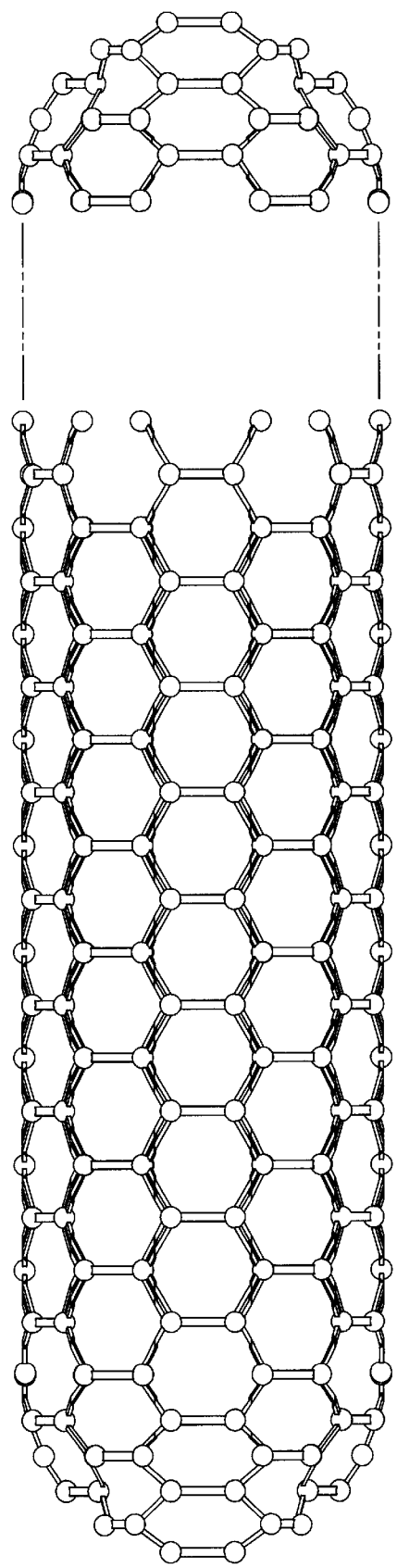
FIG. 2A is a schematic side view of a hemispherical cap and strand of a single wall carbon nanotubular fiber where one end is capped and other end is open, with such fiber being useful in accordance with the present invention.
Figure 2B:
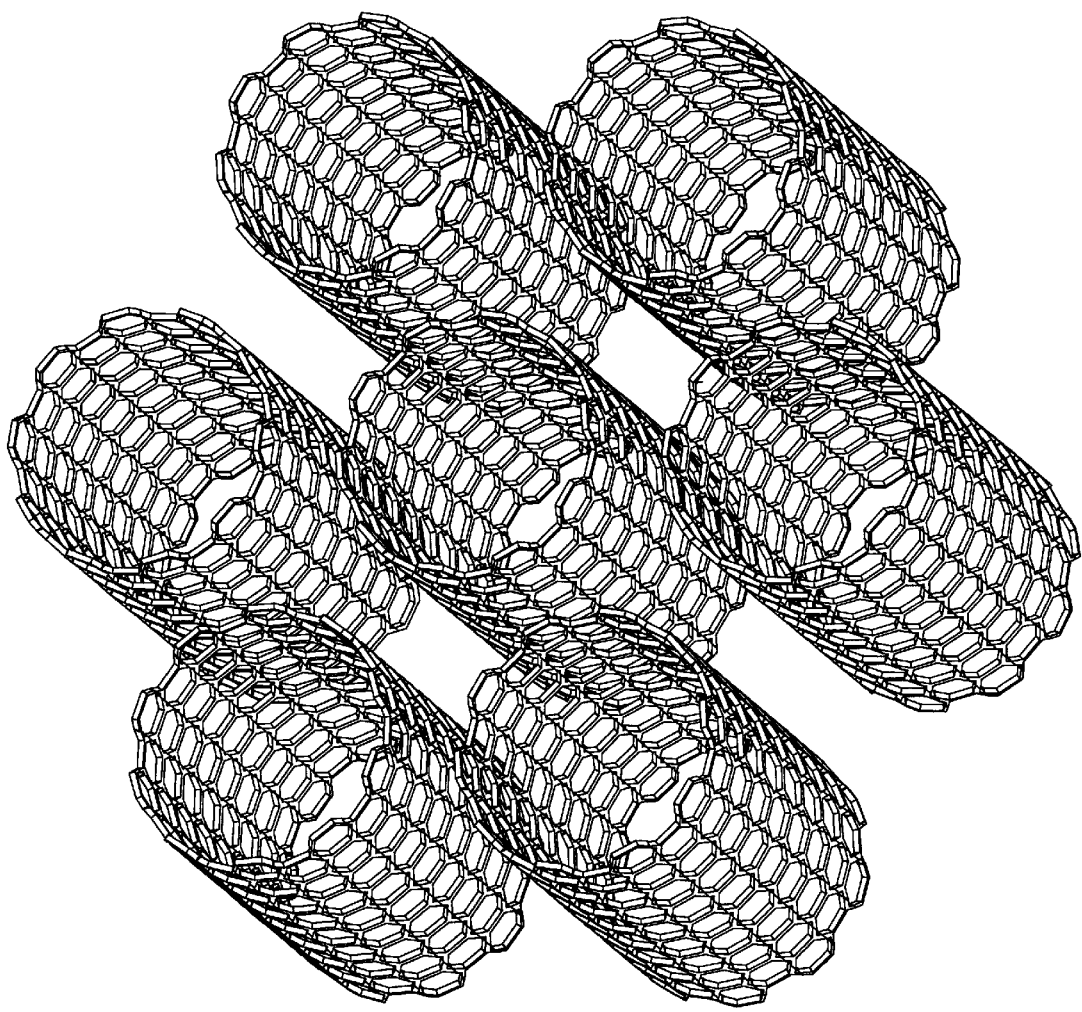
FIG. 2B is a schematic end, cross sectional view of a bundle of open single wall carbon nanotubular fibers that can be used in accordance with the present invention.
Figure 2C:
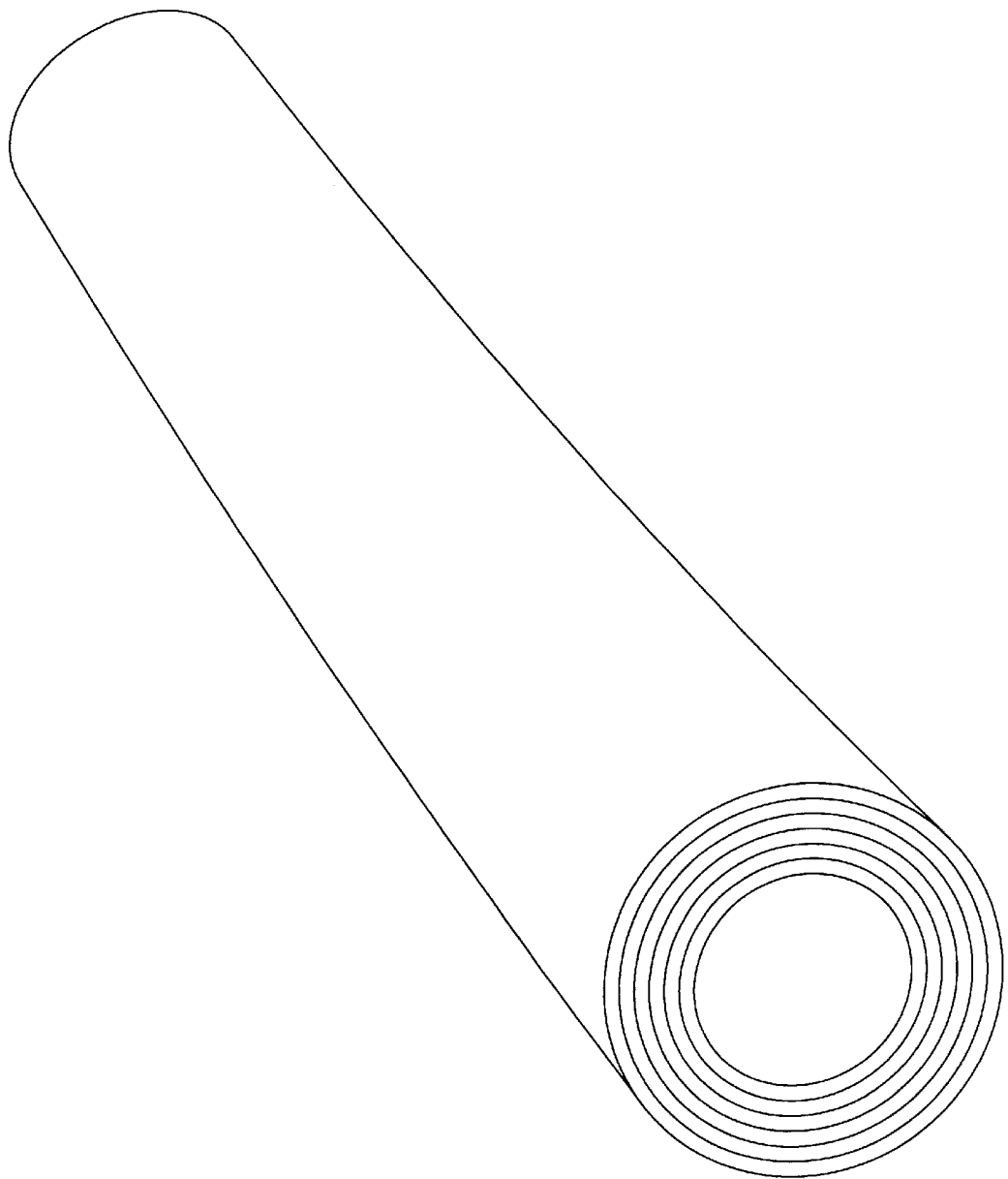
FIG. 2C is a schematic, cross sectional view of multi-walled carbon nanotubular fibers with seven concentric walls that can be used in accordance with the present invention.

A source of cost-effective carbon nanotubular fibers 11 is also provided. The fibers 11 function as the primary current conducting element in the bipolar plate. The nanotubular fibers 11 can be from commercially available sources, such as that sold under the name Pyrograf III™ and made by Applied Sciences Inc. Hyperion Catalysis International also produces multiwall nanotubular fibers, such as that sold under the name Graphite Fibril™. FIGS. 2A–C depict some commercially available examples of useful carbon nanotubular fibers 11. FIG. 2A schematically shows a cross-sectional side view of a single wall nanotubular fiber 11 that is capped with a hemispherical cluster of carbon atoms. FIG. 2B schematically shows a cross-sectional end view of a number of open, single wall nanotubular fibers 11 in a hexagonally arranged bundle. FIG. 2C schematically shows a cross-sectional view of a multiwall nanotube 11 with eight concentric walls. If not commercially obtained, the carbon nanotubular fibers 11 can by synthesized by a catalytic chemical vapor deposition process at either ambient pressure or high pressure, a graphite arc process in the presence or absence of a catalyst or a laser-evaporation deposition process in the presence of a catalyst, as described by Tibbetts et al. (Carbon, Volume 32, p.569, 1994), Iijima (Nature, Volume 354, p.56, 1991) and Thess et al. (Science, Volume 273, p. 483, 1996), respectively, which are incorporated herein by reference.

In general, the carbon nanotubular fibers 11 are characterized by a diameter on the order of nanometers. Preferably, the carbon fibers 11 have an average diameter from about 0.5 nm and up to about 300 nm. More preferably, the average diameter of multiwall nanotubular fibers is between about 10 to 200 nm, and the average diameter of single wall nanotubular fibers is between about 0.5 to 5 nm. In this preferred diameter range, carbon nanotubular fibers 11 exhibit high electrical coherence and, therefore, very high electrical conductivity. Multiwall nanotubular fibers in this preferred diameter range and of the type shown in FIG. 2C can be produced cost-effectively, permitting the fabrication of polymer composites with sufficient electrical conductivity at relative low loading of carbon fibers 11. Single wall nanotubular fibers are more conductive and can be used in the form of bundles shown in FIG. 2B, but they are presently rather expensive. A fiber with diameter above about 300 nm tends to be defective, resulting in loss of electrical conductivity. Large diameter fibers also have relatively poor bonding to the resin matrix 10.

The average lengths of the fibers 11 can vary, preferably between about 1 $\mu$m and up to about 1000 $\mu$m. Fibers 11 shorter than about 1 $\mu$m will have decreased mechanical strength due to their small aspect ratio (i.e., the ratio of the length of the fiber to its diameter). Fibers 11 longer than about 1000 $\mu$m would be preferred for mechanical strengths higher than those presently obtained. However, long nanotubular fibers 11 are difficult to grow and specialized growth techniques may be too expensive to implement.

As indicated above, the carbon nanotubular fibers 11 can be both multiwalled and single walled graphitic tubes. In the former instance, the carbon fiber 11 comprises concentric or co-axial cylinders of increasing diameters (FIG. 2C). The amount of separation between adjacent cylinders is controlled by atomic forces of the van der Waals type and size of intercalated catalyst atoms. The separation distance is preferably about 0.33 to 0.95 nm, and more preferably about 0.34 nm for providing the atomic ordering necessary for highly desirable electrical conductivity. In the instance of a single walled tube, the carbon fiber 11 assembles as a rope-like bundle configuration held together by van der Waals atomic forces (FIG. 2B). The preferred diameter of a rope composed of individual single wall nanotubes is about 5 and 30 nm, and more preferably about 20 nm.

In a preferred composition having only the resin 10 and the nanotubular carbon fibers 11, the latter is present at about 7 to 85 wt. %. More preferably, the carbon fibers 11 are at about 10 to 50 wt. %. Below about 7 wt. %, the resistivity levels are too high for fuel cell operation. Above about 85 wt. %, the mechanical properties of the composite starts to degrade.

Optionally, the composition of the electrically conductive plate of the present invention includes a reinforcing agent 12 that serves to provide added mechanical strength. Some examples of useful reinforcing agents 12 include chopped glass fiber, chopped carbon fiber obtained from pitch or polyacrylonitrile, mats made of carbon fiber from pitch or polyacrylonitrile and unannealed, long carbon nanotubular fibers. In an embodiment where a reinforcing agent 12 is used, the reinforcing agent 12 is present at about 10 to 25 wt. % and the carbon nanotubular fibers 11 are present at about 10 to 60 wt. %.

In still referring to FIG. 1, the nanotubular fibers 11 undergo a step of annealing 13. The purpose of annealing the fibers 11 is to enhance their electrical conductivity as a result of removing defects (i.e., carbon to oxygen bonds on the tube walls) and ordering the atomic structure of the tube walls. The annealing step 13 can be carried out between about 300 to 3000° C. and preferably at the higher end of the foregoing range in order to maximize conductivity. Above about 3000° C., carbon will start to vaporize and below about 300° C., no improvement in electrical conductivity is observed. Optionally, if cost-effective nanotubular fibers 11 with improved electrical conductive properties become available, the annealing step 13 will not be necessary.

After the annealing step 13, the resin 10, the carbon nanotubular fibers 11, and optionally the reinforcing agent 12 are mixed into an unformed mixture in a mixing step 14. Preferably, the mixing step 14 is accomplished by tumbling in order to obtain a homogeneous mixture. As an example, the mixing can be carried out using a commercial blender.

Following the mixing 14, the unformed mixture optionally undergoes a forming step 15 in which the mixture is made into various forms, such as pellets. The forming step 15 can be carried out by well-known apparatus, such as a screw-type injection molder.

Since the diameters of the fibers 11 are on the order of nanometers, adhesion between the fibers 11 and resin 10 particles occurs on the nanoscale level. Hence, the mixture formed is referred to as a nanocomposite.

Next, the mixture (whether unformed or formed) undergoes a molding step 16. For the unformed mixture, compression molding is utilized, while injection molding is employed for the formed mixture. Preferably, however, injection molding is used due to its lower manufacturing cost. Both molding processes are desirably carried out in a mold constructed out of steel. The dimensions of the mold used are compatible with the size, shape and surface requirements for the finished plate. The molding can be performed by any well-known apparatus, such as a hot press, a screw-type injection molding machine and a hybrid apparatus employing injection molding followed by compression molding.

During the molding step 16, the mixture is heated at a temperature between about 150 to 300° C. in order to bring the resin 11 to melting. For compression molding, a heating temperature of about 150 to 200° C. is more preferred in order to keep the resin 11 at a near-melt stage and thus prevent flow of the resin 11 out of the mold. The molding step 16 forms the mixture into plates typically about 1 to 1.5 mm thick. Also during the molding step 16, flow fields can be pressed or molded into the plates, as is known in the art and described, for example, in U.S. Pat. No. 5,863,671, which is incorporated herein by reference. Alternately, the flow fields can be machined onto the plates, as is also well known in the art.

EXAMPLES

Carbon nanotubular fibers under the tradename Pyrograf III™ by Applied Sciences Inc. were sieved at 20 mesh and annealed at 2000° C. for 12 hours. The fibers were mixed with Alcon™ at loadings of 25, 30, 40 and 45 wt. % of the fibers. No other reinforcing agents were added. The mixtures were formed into pellets and compression molded to form flow field plates of 2 mm thickness. The above was repeated, but the fibers were annealed at 3000° C. and the resin was polypropylene copolymers ("PP") under the tradename polypropylene TG7904 by Solvay Polymers. The loading of the fibers was at 30 and 40 wt. %. A flow field plate was also made of graphite powder and Aclon™ at a loading of 70 wt. % of graphite. The areal specific resistance through the plates were measured by a four-probe technique.

Figure 3:
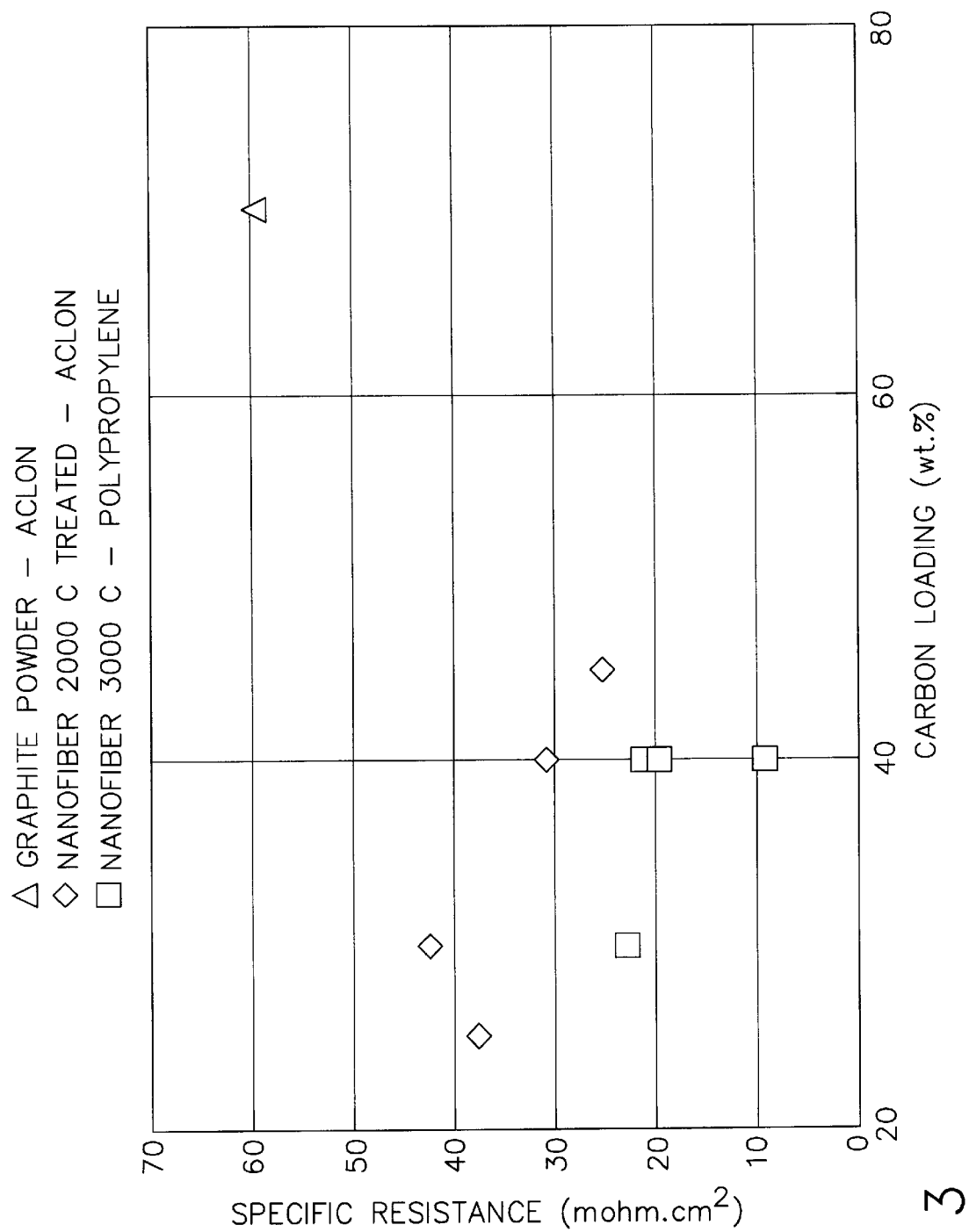
FIG. 3 is a graph of the areal specific resistance in ohms.cm$^2$ through a plate versus carbon nanotubular fiber loading in weight % for 2 mm thick and 58 cm$^2$ in area bipolar plates according to two embodiments of the present invention and one embodiment of a prior art graphite powder composite.

FIG. 3 is a graph of specific resistance versus carbon loading for the above plates. The results indicate that the resistance decreases by a factor of 2–3 on heat treatment of the nanofibers at 3000° C. Furthermore, the polypropylene composites loaded with 40 wt. %, 3000° C. annealed nanofiber show a factor of 3–6 lower resistance compared with the AcIon™ composite loaded with 70 wt. % graphite.

Figure 4:
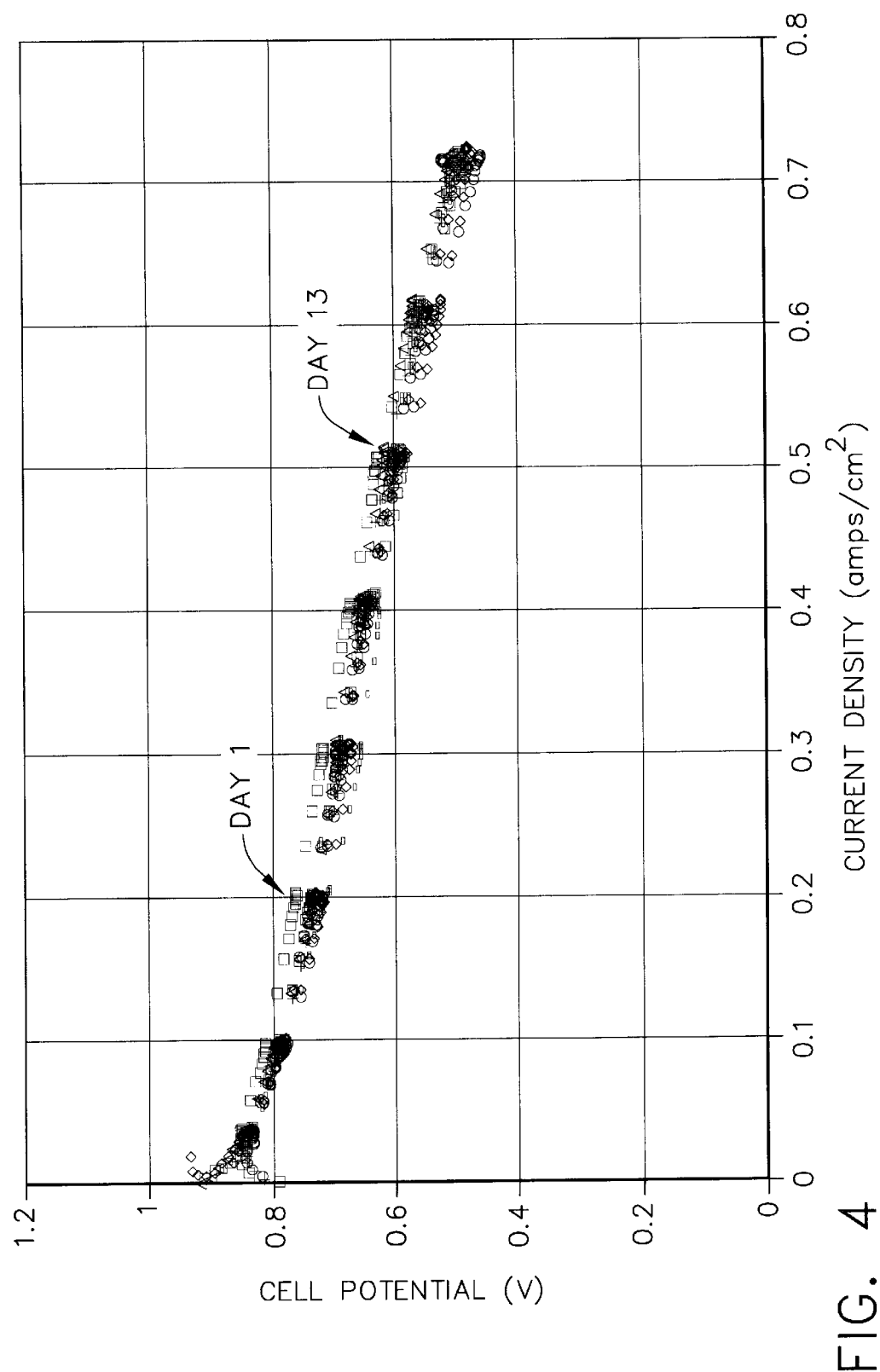
FIG. 4 is a graph of a single PEM fuel cell potential versus current density using bipolar plates according to one of the embodiments of the present invention depicted in FIG. 3.
Figure 5:
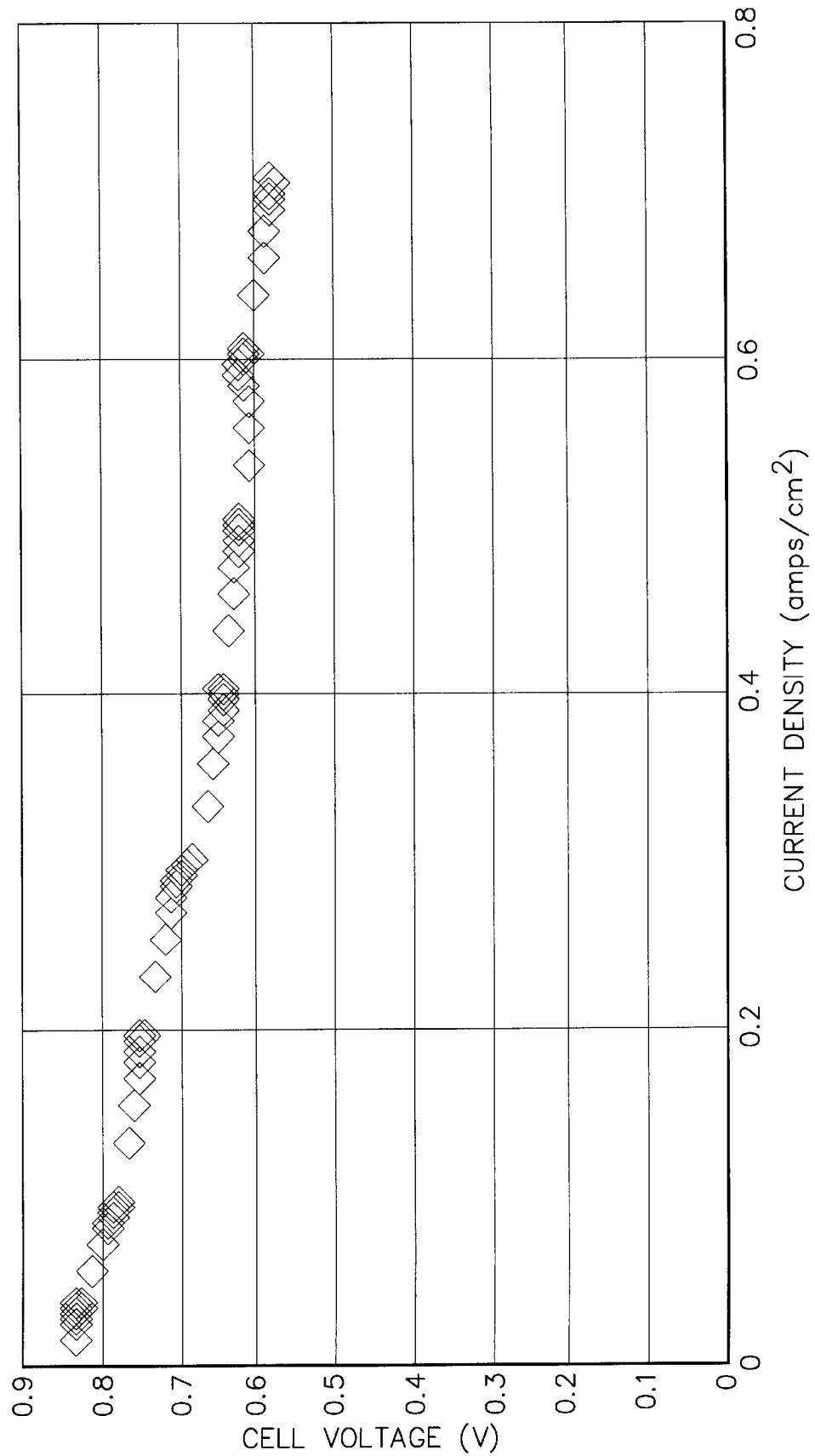
FIG. 5 is a graph of cell potential in volts versus current density using bipolar plates constructed out of pure graphite with its porosity filled by carbonized phenolic resin.

The above nanofiber-PP bipolar plate at 40 wt. % loading was then placed in a fuel cell comprised of a Nafion™ PEM and carbon gas diffusion electrodes. The fuel cell was tested for cell potential and current density. FIG. 4 is a graph of the test results that indicate cell performance comparable to that of a cell using a commercially available, resin-densified pure graphite plate (from Poco Graphite), as shown in FIG. 5.

Figure 6:
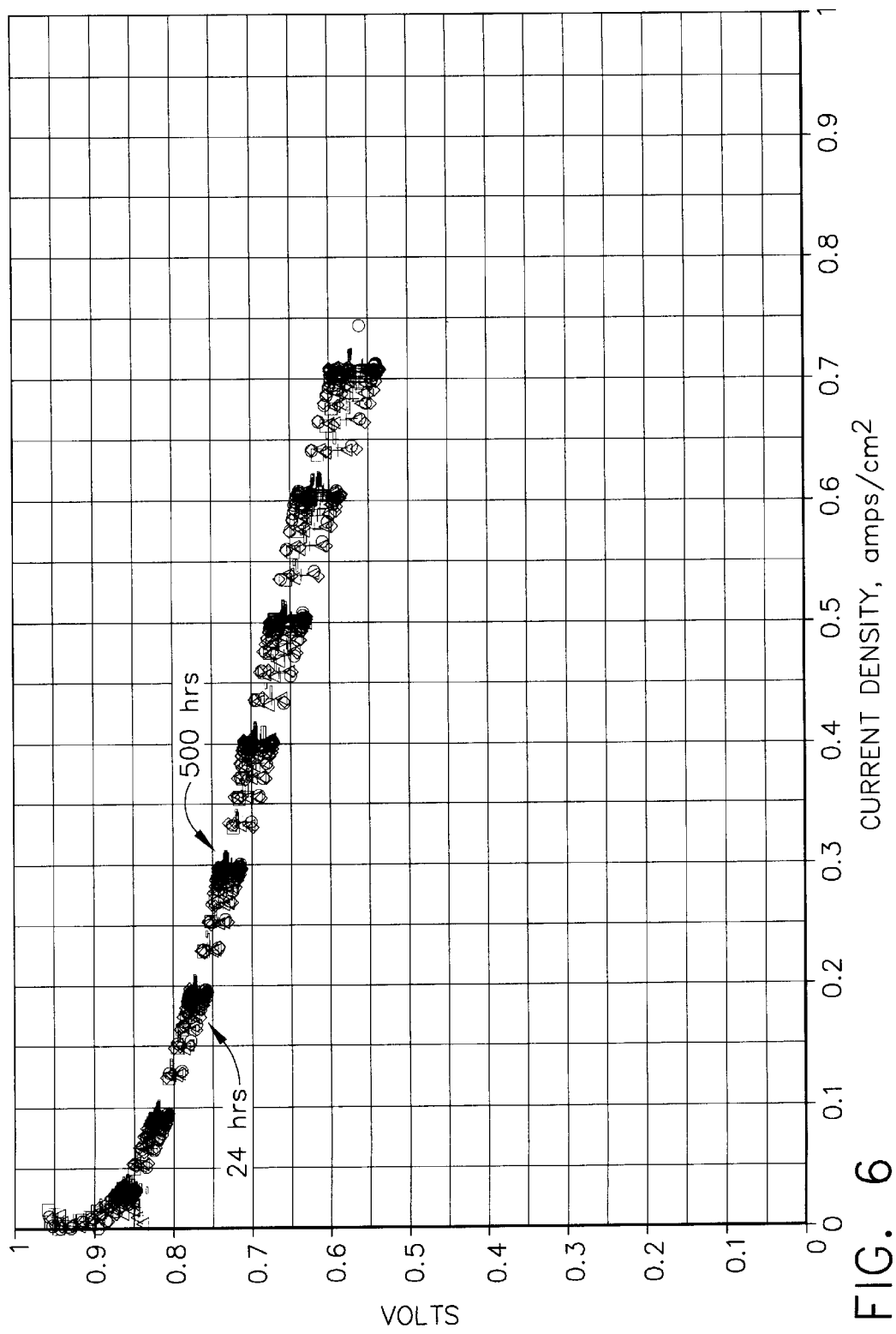
FIG. 6 is a graph of cell potential in volts versus current density using bipolar plates according to one of the embodiments of the present invention showing testing data carried out over a period of up to 500 hours.

FIG. 6 shows a continuation of the fuel cell test in FIG. 4 to 500 hrs or 21 days of continuous operation. The results in FIG. 6 show stable performance, indicating that the plates remain chemically unchanged and corrosion resistant under fuel cell conditions over an extended period of time.

Three-point flexural data for a few representative samples of the present invention are given in Table 1 below:

| Sample* | Thickness (mm) | Displacement at yield (mm) | Stress at yield (MPa) | Modulus (MPa) |
|---|---|---|---|---|
| 1 | 1.6 | 2.66 | 28.06 | 4799.3 |
| 2 | 1.6 | 2.61 | 29.52 | 3662.6 |
| 3 | 2.04 | 9.14 | 52.82 | 4347.8 |

Samples 1 and 2 composed of 40 wt. % of carbon nanotubular fibers annealed at 3000° C. and polypropylene were compression molded. Sample 3 composed of 30 wt. % of carbon nanotubular fibers annealed at 3000° C. and polypropylenewas injection molded.

As can be appreciated by those skilled in the art, the present invention provides an improved electrically conductive plate or bipolar plate, and method of making the same, for a PEM fuel cell. The bipolar plate of the present invention exhibits adequate conductivity, is corrosion resistant, and is low in manufacturing cost. The bipolar plate also has good mechanical strength and is impermeable to hydrogen and air in fuel cell operating conditions. Relatively low carbon loading in the present invention is required which, in turn, allows a fabrication process like injection molding to be used. This lowers manufacturing costs for the plates. The specific resistance of the present invention is at about 20 mohm.cm$^2$, which is well within an acceptable level (i.e., not greater than about 100 to 200 mohm.cm$^2$) for PEM fuel cells. Good flexural strength is also provided by the present invention. Over a period of more than 1000 hours, the performance of the present invention is comparable to fuel cells using graphite plates. The hydrophobicity of the fluorinated resins in the present invention can improve water management during fuel cell operation and, thus, enhance power output. Further enhancements in electrical conductivity and mechanical properties can be achieved by texturing of the nanotubular fibers by modifications of the injection process.

It should be understood, of course, that the foregoing relates to preferred embodiments of the invention and that modifications may be made without departing from the spirit and scope of the invention as set forth in the following claims.

We claim:

1. An electrically conductive plate in a proton exchange membrane fuel cell, comprising a composition made of a resin and a plurality of carbon nanotubular fibers comprising an average diameter that is at least about 1 nm and up to about 300 nm and wherein said plurality of carbon nanotubular fibers comprises multiwalled graphitic tubes containing multiple co-axial cylinders of increasing diameters.

2. The conductive place of claim 1, wherein said resin is selected from the group consisting of a thermoplastic resin; a fluorinated resin; a thermosetting resin, and a liquid crystalline.

3. The conductive plate of claim 1, wherein said resin is selected from the group consisting of polypropylene copolymers, high density polyethylene, polyacrylonitrile, polyvinylidene flouride, polychlorotrifluoroethylene, polyether etherketone, polycarbonates, polyphenylene oxide, polyester amide, epoxy, pitch and vinyl ester resins.

4. The conductive plate of claim 1, wherein said carbon nanotubular fibers are present at about 10 to 85 wt. %.

5. The conductive plate of claim 1, wherein said cylinders are separated from one another by about 0.34 nm.

6. An electrically conductive plate in a proton exchange membrane fuel cell, comprising a composition made of a resin and a plurality of carbon nanotubular fibers comprising an average diameter that is at least about 1 nm and up to about 300 nm and wherein said plurality of nanotubular fibers comprises single walled graphitic tubes bundled together in the form of a rope.

7. The conductive plate of claim 1, wherein said conductive plate is a bipolar plate.

8. An electrically conductive plate with molded channels for use in a proton exchange membrane fuel cell, comprising a composition made of a resin and a plurality of carbon nanotubular fibers present at not more than about 85 wt. % and wherein said plurality of carbon nanotubular fibers comprise multiwalled graphitic tubes containing multiple co-axial cylinders of increasing diameters.

9. The conductive plate of claim 8, wherein said carbon nanotubular fibers are present from about 7 wt. % and up to about 85 wt. %.

10. The conductive plate of claims 8, wherein said carbon nanotublar fibers have an average diameter from about 0.5 nm and up to about 300 nm.

11. The conductive plate of claim 8, wherein said carbon nanotubular fibers have an average length from about 1 µm and up to about 1000 µm.

12. The conductive plate of claim 8, wherein said cylinders are separated from one another by about 0.34 nm.

13. An electrically conductive plate with molded channels for use in a proton exchange membrane fuel cell, comprising a composition made of a resin and a plurality of carbon nanotubular fibers present at not more than about 85 wt. % and wherein said plurality of carbon nanotubular fibers comprises single walled graphitic tubes that are bundled together as a rope.

14. The conductive plates of claim 8, wherein said carbon nanotubular fibers have been heat-treated between about 300 to about 3000° C.

15. The conductive plate of claim 8, wherein said resin is selected from the group consisting of polypropylene copolymers, high density polyethylene, polyacrylonitrile, polyvinylidene fluoride, polychlorotrifluoroethylene, polyether etherketone, polycarbonates, polyphenylene oxide, polyester amide, epoxy, silicone rubber, pitch and vinyl ester resins.

16. The conductive plate of claim 8, wherein said composition further comprises a reinforcing agent.

17. The conductive plate of claim 16, wherein said reinforcing agent is selected from the group consisting of chopped glass fiber, chopped carbon fiber, carbon fiber mats and as-prepared carbon nanotubular fiber.

\* \* \* \* \*